(No Model.)
N. P. BOWLER.
CAR WHEEL.
No. 350,107. Patented Oct. 5, 1886.
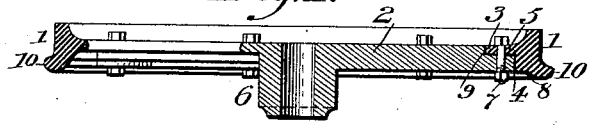
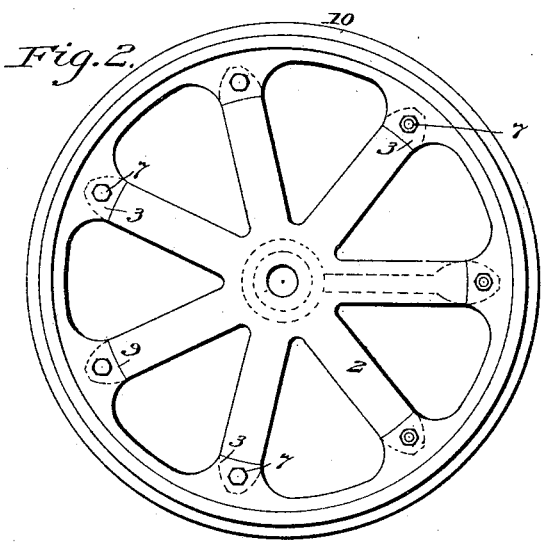
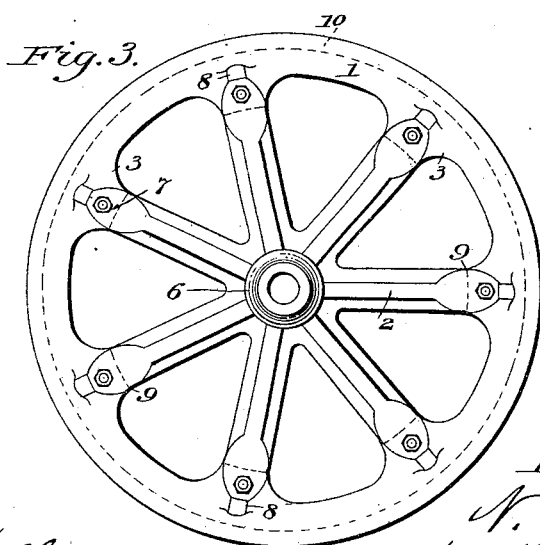
Witnesses.
Frank Straus
Orlando Hall
Inventor:
N. P. Bowler,
per F. J. & G. C. Wing
Attorneys.

UNITED STATES PATENT OFFICE.

NOADIAH P. BOWLER, OF CLEVELAND, OHIO.

CAR-WHEEL.

SPECIFICATION forming part of Letters Patent No. 350,107, dated October 5, 1886.

Application filed May 24, 1886. Serial No. 203,175. (No model.)

*To all whom it may concern:*

Be it known that I, NOADIAH P. BOWLER, a citizen of the United States, residing at Cleveland, in the county of Cuyahoga and State of Ohio, have invented a new and useful Improvement in Wheels for Cars of Street Railways, of which the following is a specification.

The object of my invention is to provide a wheel whose central body is spoked instead of solid or plated, and whose tire is applied thereto and secured in a manner admitting of ready removal and substitution.

Wheels for railway uses can be shown with some features common to mine—metal spokes, for instance, or a chilled tire distinct from the unchilled body, and even a spoked hub surmounted by a tire of different substance or grade. Each of these devices, however, has corresponding defects seriously affecting its adoption for street-car purposes. The spoked wheel commonly used in the latter service is cast in one piece; but its tire-rim and body are then necessarily of the same grade or quality of metal, and therefore either entirely of hard or entirely of soft material. If the former, a comparatively strong but a costly wheel is obtained; if the latter, a cheaper but a cumbrous and speedily destructible article has been preferred. To the objections above suggested is superadded, in that class of wheels whose tires are sprung on or otherwise held to their place, a further objection due to their intricacy of detail and difficulty of adjustment, which not only confines any alterations thereof to the shop and shopmen, but deprives the wheel of any true interchangeability of its parts. All prior devices are for such reasons but illy adapted to horse-car roads, or to any except the heavy and expensive uses of steam transportation. My device, however, by the mode employed of attaching the tire to the spokes and the support, the latter being made at the same time to contribute to the tread and flange, renders practicable the combination in street-car wheels of lightness, cheapness, durability, and interchangeability to a degree not heretofore attained.

An additional feature and novelty of my invention is the ability to speedily replace the tire, wherever it may be when disabled by accident or use, without withdrawing the wheel from the axle, or without the assistance of tool or other appliance than an ordinary hand-wrench. This advantage is appreciated when it is considered that car-wheels are most frequently pressed onto the axle, and can therefore be removed only at a shop.

The accompanying drawings illustrate my invention, wherein Figure 1 represents a vertical section of a wheel through the center of the hub; Fig. 2, a front and Fig. 3 a rear elevation of the wheel.

Similar numbers indicate similar parts in the several drawings.

1 is a tire with the usual flange, rim, and tread. From the under side of the flange 10, at intervals corresponding in their number to the spokes 2 2, and of the same piece with both flange and rim, knobs or projections 8 8, of nearly the depth of said flange, extend toward the hub, and terminate at about the middle point of said tire in faces 4 4, perpendicular to those of the tire 1. The latter, at the points thereof containing said projections, is widened until about double its width at other points of the periphery, upon a line, 9, parallel with the course of the tread, or substantially so, thereby forming seats at 5 9 4 on the inside of the tire to receive corresponding seats on the extremities of the spokes at 5, 9, and 4, and into which the tire and spokes are secured together by the bolts at 7.

The spokes 2, which may be made of any material preferred, and, if desired, in the same piece as the hub 6, contain faces and seats at their outer extremities, 4 5 9, which correspond with and fit those of the tire similarly to a scarf-joint, thereby prolonging the axis-lines of the knobs or projections 8 8 radially through the spokes 2 to the hub. Bolt-holes are located in the extremities of the spokes 2 at 7 to register with bolt-holes through the widened portions of the tire 3 3. The wheel is completed by simply placing the tire upon the spokes at the several projections 3 8, and firmly screwing or riveting the bolts home at 7. The spokes 2, being then in close juxtaposition with the knobs or projections 8 beneath the flange 10, are in effect extended to and merged therewith, and consequently will not only furnish a complete support to the flange itself, but will take up and relieve the bolts at 7 of wrenching and lateral shocks at the flange.

I recommend that in attaching the tire a rubber or other packing be used between the faces at 5, to distribute the jar and prevent cutting.

Having described my invention, I claim—

1. A car-wheel composed of a hub, a tire, and spokes, the latter connected to the hub, and having their other extremities bolted in a scarf-joint to the inside surface of the tire, the said tire being provided with plane faces and seats to receive and closely fit, corresponding with the faces and seats upon the said extremities of the spokes, substantially as described.

2. A car-wheel composed of a hub and spokes and flanged tire, the latter provided at equal intervals with the projecting plates 3 3, having smooth faces, and the spokes having their outer ends halved like a scarf-jointing, and being fastened by bolts in the form of such joint to said plates 3 3, substantially as shown and described.

3. The construction, in car-wheels whose parts are interchangeable, of the flanged tire 1, provided with shoulders 8 8 at the base of the flange, and projecting faces 3 3, whose surfaces are on the same plane with the lateral surface of the rim of the tire, fastened by bolts to spokes 2 2, whose outer ends are scarfed, such spokes being also connected with a hub, 6, the connection of the tire to the spokes forming a scarf-joint, substantially as shown and described.

4. A car-wheel composed of a flanged tire, spokes, and hub, said tire being provided with projecting plates 3 3, whose faces are on the same plane as the lateral face of the rim of the tire, and having elevations beneath the flange, which form shoulders against which the ends of the spokes may rest when they are bolted to the projections 3 3 at 5 by bolt 7, and forming in such position, with the scarfed ends of said spokes, a complete scarf-joint, substantially as shown and described.

5. A car-wheel composed of a hub, 6, and spokes 2 2, connected to said hub at their one end and halved or scarfed at their other into the straight faces 5 9 4, bolted to and closely fitting against the tire 1 in corresponding faces on its inner side, the latter faces being formed by the projections 3 3 from the under side of said tire toward the hub, and the elevations 8 8 from said tire having straight faces at 4 4 at the same angle with the inner surface of the projections 3 3 as the faces of the spokes at 9 9 have to their faces at 5 5, the said elevations extending to and being a part of the base and under side of the flange 10, substantially as shown and described.

NOADIAH P. BOWLER.

Witnesses:
C. W. NOBLE,
GEO. C. WING.